US012699345B2

(12) United States Patent
Okabe

(10) Patent No.: US 12,699,345 B2
(45) Date of Patent: Aug. 4, 2026

(54) IMAGE FORMING APPARATUS HAVING TRAY FOR RECEIVING RECORDING MEDIUM

(71) Applicant: Brother Kogyo Kabushiki Kaisha, Nagoya (JP)

(72) Inventor: Yasushi Okabe, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/906,631

(22) Filed: Oct. 4, 2024

(65) Prior Publication Data

US 2025/0181020 A1 Jun. 5, 2025

Related U.S. Application Data

(63) Continuation of application No. 18/063,847, filed on Dec. 9, 2022, now Pat. No. 12,124,203, which is a (Continued)

(30) Foreign Application Priority Data

May 31, 2013 (JP) ................................ 2013-116298

(51) Int. Cl.
*G03G 15/00* (2006.01)
*B65H 1/04* (2006.01)
(Continued)

(52) U.S. Cl.
CPC ........... *G03G 15/6529* (2013.01); *B65H 1/04* (2013.01); *B65H 1/266* (2013.01); *B65H 5/062* (2013.01);
(Continued)

(58) Field of Classification Search
CPC .. G03G 15/6529; G03G 15/1605; B65H 1/04; B65H 1/266; B65H 5/062;
(Continued)

(56) References Cited

U.S. PATENT DOCUMENTS 5,838,456 A 11/1998 Wagi et al.
7,731,182 B2 6/2010 Nishii et al.
(Continued)

FOREIGN PATENT DOCUMENTS

JP H03-186529 A 8/1991
JP H06-16253 A 1/1994
(Continued)

OTHER PUBLICATIONS

Oct. 25, 2016—(JP) Office Action—App 2013-116298, Eng Tran.

*Primary Examiner* — Thomas A Morrison
(74) *Attorney, Agent, or Firm* — Banner & Witcoff, Ltd.

(57) ABSTRACT

In an image forming apparatus, a tray having first and second receiving portions is configured to move between a first position, at which at least part of the tray is positioned inside an apparatus body, and a second position, at which the tray is outside the apparatus body. The tray in the first position allows a first recording medium to be conveyed from the first receiving portion. When the tray is in the first position, the second receiving portion is configured to move between a third position, which is at an upstream side relative to a first opening of the apparatus body in a second direction, and a fourth position, which is at a downstream side relative to the third position in the second direction. The second receiving portion at the third position allows a second recording medium to be conveyed from the second receiving portion in the second direction.

12 Claims, 8 Drawing Sheets

Related U.S. Application Data continuation of application No. 16/684,173, filed on Nov. 14, 2019, now Pat. No. 11,526,111, which is a continuation of application No. 15/928,973, filed on Mar. 22, 2018, now Pat. No. 10,503,112, which is a continuation of application No. 14/959,909, filed on Dec. 4, 2015, now Pat. No. 9,927,758, which is a continuation of application No. 14/291,653, filed on May 30, 2014, now Pat. No. 9,206,006.

(51) Int. Cl.

| | |
|---|---|
| ***B65H 1/26*** | (2006.01) |
| ***B65H 5/06*** | (2006.01) |
| ***B65H 5/26*** | (2006.01) |
| ***B65H 7/20*** | (2006.01) |
| ***G03G 15/16*** | (2006.01) |

(52) U.S. Cl.

CPC ................ *B65H 5/26* (2013.01); *B65H 7/20* (2013.01); *G03G 15/1605* (2013.01); *B65H 2404/144* (2013.01); *B65H 2404/152* (2013.01); *B65H 2405/115* (2013.01); *B65H 2405/313* (2013.01); *B65H 2405/324* (2013.01); *B65H 2405/332* (2013.01); *B65H 2407/21* (2013.01); *B65H 2801/09* (2013.01)

(58) Field of Classification Search

CPC ...... B65H 5/26; B65H 7/20; B65H 2404/144; B65H 2404/152; B65H 2405/115; B65H 2405/313; B65H 2405/324; B65H 2405/332; B65H 2407/21; B65H 2801/09

See application file for complete search history.

(56) References Cited

U.S. PATENT DOCUMENTS

| | | | | |
|---|---|---|---|---|
| 7,909,318 | B2 | 3/2011 | Kim et al. | |
| 8,200,119 | B2 | 6/2012 | Okabe et al. | |
| 8,960,664 | B2 | 2/2015 | Maeda et al. | |
| 9,242,814 | B2 | 1/2016 | Ichikawa et al. | |
| 12,124,203 | B2 * | 10/2024 | Okabe | B65H 1/04 |
| 2004/0190934 | A1 | 9/2004 | Okabe | |
| 2005/0093222 | A1 | 5/2005 | Ouchi et al. | |
| 2006/0140668 | A1 | 6/2006 | Sato et al. | |
| 2006/0140669 | A1 | 6/2006 | Sato | |
| 2007/0013760 | A1 | 1/2007 | Takahashi | |
| 2007/0132170 | A1 | 6/2007 | Butler | |
| 2007/0273085 | A1 | 11/2007 | Nanno et al. | |
| 2008/0054554 | A1 | 3/2008 | Nishii et al. | |
| 2011/0163495 | A1 | 7/2011 | Aoyama et al. | |
| 2011/0236056 | A1 | 9/2011 | Mori et al. | |
| 2012/0070185 | A1 | 3/2012 | Yokota | |
| 2012/0161381 | A1 | 6/2012 | Nakamura et al. | |
| 2012/0207510 | A1 | 8/2012 | Sato | |
| 2013/0161893 | A1 | 6/2013 | Ro et al. | |
| 2013/0221612 | A1 | 8/2013 | Harada et al. | |
| 2013/0249162 | A1 | 9/2013 | Ikeura et al. | |

FOREIGN PATENT DOCUMENTS

| | | | |
|---|---|---|---|
| JP | 2002-154717 | A | 5/2002 |
| JP | 2004-302009 | A | 10/2004 |
| JP | 2007-022744 | A | 2/2007 |
| JP | 2007-302422 | A | 11/2007 |
| JP | 2008-292804 | A | 12/2008 |
| JP | 2010-276743 | A | 12/2010 |
| JP | 2012-168272 | A | 9/2012 |

* cited by examiner

IMAGE FORMING APPARATUS HAVING TRAY FOR RECEIVING RECORDING MEDIUM

CROSS REFERENCE TO RELATED APPLICATION

This application is a continuation of prior U.S. application Ser. No. 18/063,847, filed Dec. 9, 2022, which is a continuation of prior U.S. application Ser. No. 16/684,173, filed Nov. 14, 2019, now U.S. Pat. No. 11,526,111 B2, issued Dec. 13, 2022, which is a continuation of prior U.S. application Ser. No. 15/928,973, filed Mar. 22, 2018, now U.S. Pat. No. 10,503,112 B2, issued Dec. 10, 2019, which is a continuation of prior U.S. application Ser. No. 14/959,909, filed Dec. 4, 2015, now U.S. Pat. No. 9,927,758 B2, issued Mar. 27, 2018, which is a continuation of prior U.S. application Ser. No. 14/291,653, filed May 30, 2014, now U.S. Pat. No. 9,206,006 B2, issued Dec. 8, 2015, which claims priority from Japanese Patent Application No. 2013-116298 filed May 31, 2013, the entire content of which is incorporated herein by reference.

TECHNICAL FIELD

The present invention relates to an image forming apparatus, and more particularly, to an electro-photographic type image forming apparatus.

BACKGROUND

There has been proposed a tandem type color printer in which a plurality of cartridges is attachable to and detachable from an apparatus body. The plurality of cartridges is arrayed in a cartridge tray, and the cartridge tray is slidably supported with respect to the apparatus body. This printer is described in Japanese Patent Application Publication No. 2008-292804, for example.

SUMMARY

It is an object of the invention to provide an improved image forming apparatus.

In order to attain the above and other objects, the invention provides an image forming apparatus which may include: an apparatus body; a process unit; and a tray. The apparatus body may have a first opening. The process unit may have a photosensitive body extending in a first direction. The tray may have a first receiving portion configured to receive a first recording medium and a second receiving portion configured to receive a second recording medium different from the first recording medium. The tray may be configured to move between a first position, at which at least part of the tray is positioned inside the apparatus body, and a second position, at which the tray is outside the apparatus body, a second direction being defined as a direction that intersects both of a vertical direction and the first direction and is directed from the second position to the first position. The tray positioned in the first position may be configured to allow the first recording medium to be conveyed from the first receiving portion. In a state where the tray is in the first position, the second receiving portion may be configured to move between a third position, which is at an upstream side relative to the first opening in the second direction, and a fourth position, which is at a downstream side relative to the third position in the second direction. The second receiving portion at the third position may be configured to allow the second recording medium to be conveyed from the second receiving portion in the second direction.

BRIEF DESCRIPTION OF THE DRAWINGS

The particular features and advantages of the invention as well as other objects will become apparent from the following description taken in connection with the accompanying drawings, in which.

DETAILED DESCRIPTION

1. Overall Structure of Printer

Figure 1A:
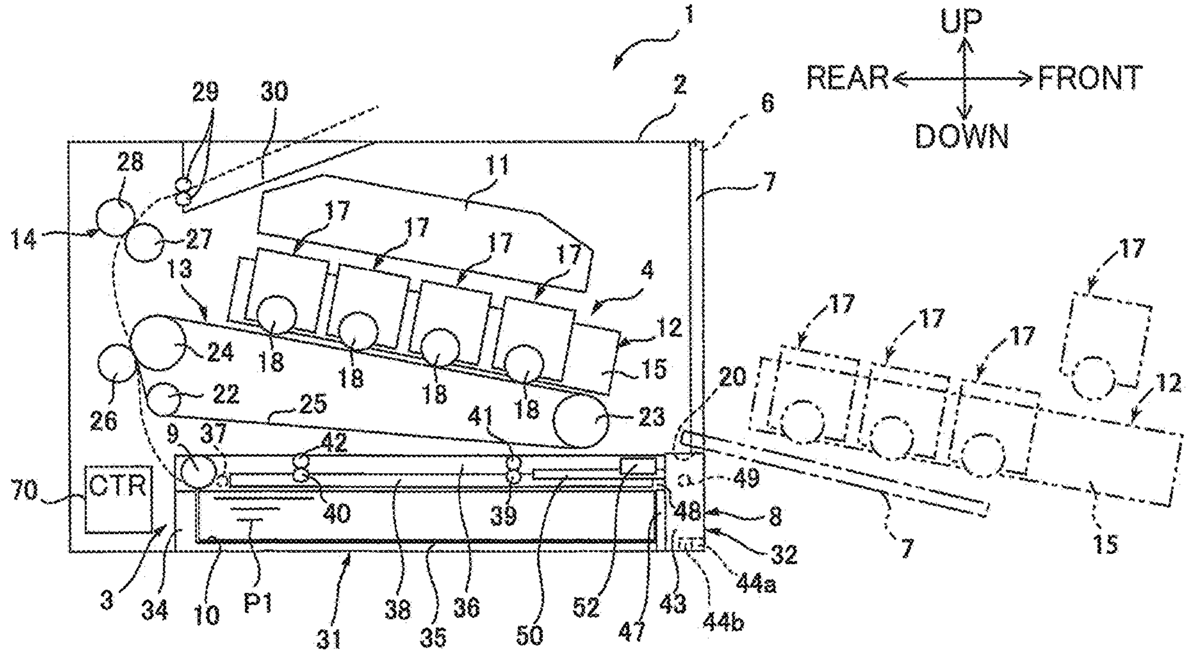
FIG. 1A is a cross-sectional view of a printer as an example of an image forming apparatus according to a first embodiment of the present invention, the cross-sectional view being taken along a widthwise center line of the printer and showing that a pull-out portion is at an inside position.

A printer 1 as an example of an image forming apparatus according to a first embodiment of the present invention will be described with reference to FIGS. 1A through 3. The printer 1 is a transverse-mounted type and intermediate image transfer type color laser printer. The printer 1 includes a main casing 2 as an example of an apparatus body, a sheet supply unit 3 for supplying a sheet, an image forming unit 4 for forming an image onto a sheet supplied by the sheet supply unit 3, and a controller 70 those provided in the main casing 2.

The terms "upward", "downward", "upper", "lower", "above", "below", "beneath", "right", "left", "front", "rear" and the like will be used throughout the description assuming that the printer 1 is disposed in an horizontal orientation in which it is intended to be used. In use, the laser printer 1 is disposed as shown in FIG. 1A in which the upper side of the printer 1 in FIG. 1A is considered the "upper side" of the printer 1, the lower side of the printer 1 in FIG. 1A is considered the "lower side" of the printer 1, the right side of the printer 1 in FIG. 1A is considered the "front side" of the printer 1, and the left side of the printer 1 in FIG. 1A is considered the "rear side" of the printer 1. Further, left and right sides of the printer 1 are defined based on the perspective of the user facing the front side of the printer 1. Thus, the near side of the printer 1 in FIG. 1A is considered the "left side," and the far side is considered the "right side." The left-right direction of the printer 1 is also referred to as a "widthwise direction" of the printer 1. Here, right-left direction is an example of a first direction. Further, a direction from the front to the rear is an example of a second direction, and the front side and the rear side are an example of an upstream side and a downstream side, respectively, of the second direction.

(1) Main Casing

The main casing 2 is of a box-shape having a generally rectangular side view, in which the sheet supply unit 3 and the image forming unit 4 are accommodated. The main casing 2 includes a front wall 5 as an example of a first wall. The main casing 2 has a front opening 6 as an example of a second opening opened at the front wall 5 and a tray accommodating portion 71 in a bottom portion of the main casing 2. The main casing 2 also includes a front cover 7 pivotally movable about a lower end portion between a closed position closing the opening 6 as shown in FIG. 1A by a solid line and an open position opening the opening 6 as shown by a two dotted chain line in FIG. 1A.

(2) Sheet Supply Unit

The sheet supply unit 3 includes a sheet tray 8 and a sheet supply roller 9.

The sheet tray 8 is removably mounted in the tray accommodating portion 71, and is generally rectangular shaped in side view and is box shaped with its upper end being open, and its inner space partitioned as a sheet accommodation chamber 10 as an example of a first receiving portion.

A stack of first sheets P1 as an example of a first recording medium is accommodated in the sheet accommodation chamber 10. That is, the sheet accommodation chamber 10 is configured to receive the first sheets P1.

The sheet supply roller 9 is generally of a cylindrical shape extending in the right-left direction, and is positioned above a rear end portion of the sheet tray 8. The sheet supply roller 9 is rotatably supported to the main casing 2.

(3) Image Forming Unit

The image forming unit 4 includes a scanner unit 11, a process unit 12, a transfer unit 13 and a fixing unit 14.

(3-1) Scanner Unit

The scanner unit 11 is positioned at an upper internal portion of the main casing 2. The scanner unit 11 is adapted to emit laser beams to a plurality of (four) photosensitive drums 18 (described later) on a basis of image data to expose surfaces of the photosensitive drums 18 to the laser beams.

(3-2) Process Unit

The process unit 12 is positioned at a vertically intermediate portion in the internal portion of the main casing 2, and below the scanner unit 11. More specifically, process unit 12 has a rear end portion positioned slightly higher than a vertically center portion of the main casing 2, and has a front end portion positioned slightly lower than the vertically center portion, such that the process unit 12 is inclined downward toward the front.

The process unit 12 includes a process frame 15 as an example of a moving member and four process cartridges 17 for four different colors as an example of cartridges. The process unit 12 is movable with respect to the main casing 2 through the opening 6. More specifically, the process unit 12 is movable substantially in the front-rear direction between an internal position inside the main casing 2 as shown in FIG. 1A by a solid line, and an external position outside of the main casing 2 as shown by a two-dotted chain line in FIG. 1A. Thus, the process unit 12 is detachable from and attachable to the main casing 2.

The process frame 15 is of a frame shape having generally a rectangular shape in side view. The process frame 15 is configured such that each of the plurality of process cartridges 17 can be attached to and detached from the process frame 15 when the process frame 15 is at the external position. Further, the process frame 15 is configured to support the plurality of process cartridges 17 such that the plurality of process cartridges 17 are positioned side by side with a space therebetween and are arrayed in the front-rear direction in the process frame 15.

For example, toners of black, yellow, magenta, and cyan are respectively accommodated in the plurality of process cartridges 17 in an order from front to rear cartridges. Each of the process cartridges 17 is provided with the photosensitive drum 18.

The photosensitive drum 18 is positioned at a lower end of the process cartridge 17, and is in the form of a generally cylindrical shape extending in the right-left direction. Further, the photosensitive drum 18 is rotatably supported to the process cartridge 17 and has a portion exposing outside from the lower end of the process cartridge 17. Incidentally, the process cartridge 17 also includes a developing roller (not shown) and a charger (not shown).

(3-3) Transfer Unit

The transfer unit 13 is positioned inside the main casing 2 and above the sheet supply unit 3 and below the process unit 12. The transfer unit 13 includes a drive roller 24, a first driven roller 23, a second driven roller 22, an intermediate transfer belt 25, and a secondary transfer roller 26.

The drive roller 24 is generally cylindrical shaped and extends in the right-left direction. The drive roller 24 is rotatably supported to the main casing 2 at a position rearward of the process unit 12.

The first driven roller 23 is generally cylindrical shaped and extends in the right-left direction. The first driven roller 23 is rotatably supported to the main casing 2 at a position below the front end portion of the process unit 12. More specifically, an imaginary line connecting between centers of the first driven roller 23 and the drive roller 24 provides an inclination coincident with the inclination of the process unit 12.

The second driven roller 22 is generally cylindrical shaped and extends in the right-left direction. The second driven roller 22 is rotatably supported to the main casing 2 at a position below the drive roller 24.

The intermediate transfer belt 25 is positioned below the respective photosensitive drums 18 such that an upper portion of the intermediate transfer belt 25 is in contact with the respective photosensitive drums 18. The intermediate transfer belt 25 is mounted over the drive roller 24, the first driven roller 23 and the second driven roller 22. Further, the intermediate transfer belt 25 is circulated by the rotations of the drive roller 24, the first driven roller 23 and the second driven roller 22 such that the upper portion of the intermediate transfer belt 25 is moved frontward.

The secondary transfer roller 26 is generally cylindrical shaped extending in the right-left direction, and is rotatably supported to the main casing 2 at a position opposite to the drive roller 24 with respect to the intermediate transfer belt

25. Further, the secondary transfer roller 26 is positioned at a rear side of the intermediate transfer belt 25 and diagonally above and rearward of the second driven roller 22. The secondary transfer roller 26 is in contact with the rear end portion of the intermediate transfer belt 25.

(3-4) Fixing Unit

The fixing unit 14 is positioned above the secondary transfer roller 26 and includes a heat roller 27 and a pressure roller 28 positioned diagonally above and rearward of the heat roller 27. Discharge rollers 29 and a discharge tray 30 are provided downstream of the fixing unit 14 in the sheet feeding direction.

2. Details of Sheet Supply Unit

Figure 2A:
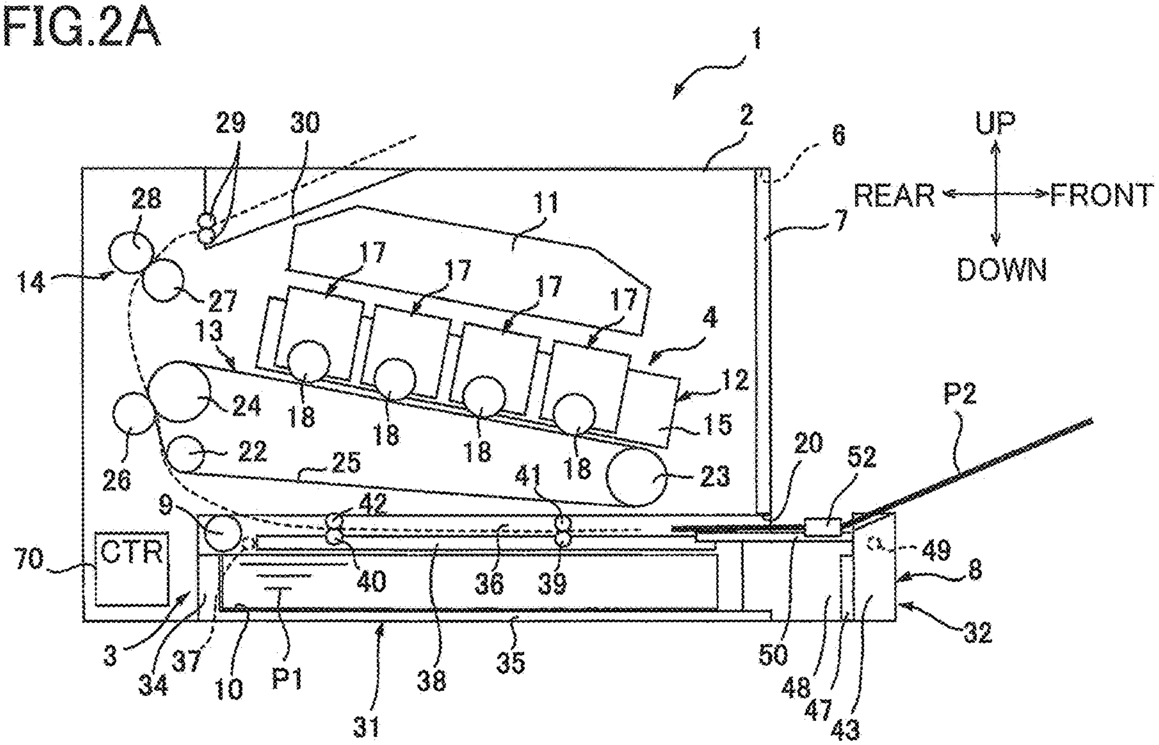
FIG. 2A is a cross-sectional view of the printer according to the first embodiment, the cross-sectional view being taken along the widthwise center line of the printer and showing that the pull-out portion is in a pulled-out position.

As shown in FIGS. 1A and 2A, the main casing 2 has an opening 20 as an example of a first opening. The opening 20 is formed in the front wall 5 at a position below the front opening 6, and is in communication with the tray accommodating portion 71.

The sheet supply unit 3 includes the sheet tray 8, the sheet supply roller 9, a first conveying roller 41, and a second conveying roller 42.

Figure 3:
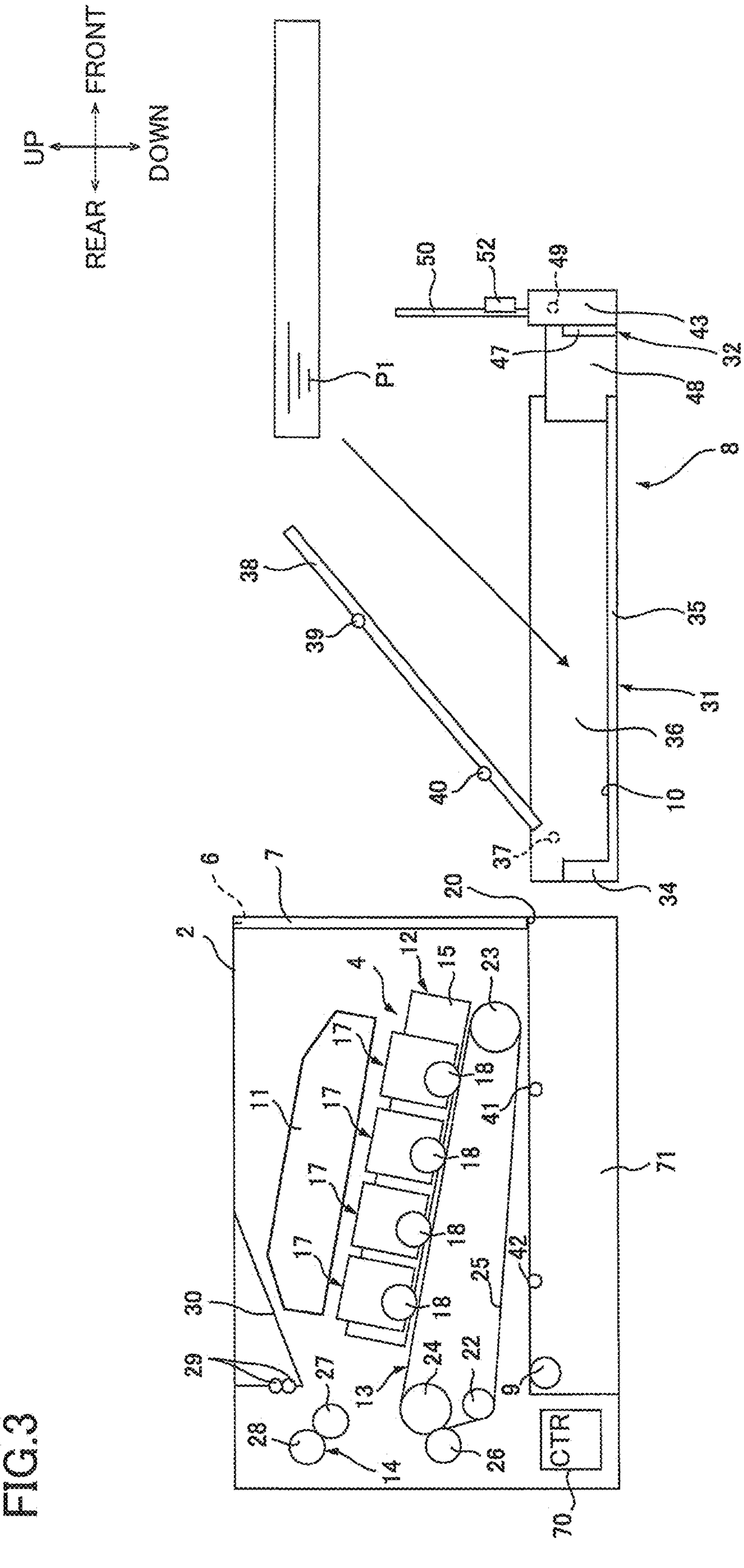
FIG. 3 is a cross-sectional view of the printer according to the first embodiment and showing a withdrawn state of a sheet tray.

The sheet tray 8 can move through the opening 20 between a first position shown in FIG. 1A where the sheet tray 8 is mounted in the tray accommodating portion 71 in the main casing 2, and a second position shown in FIG. 3 that is outside the main casing 2 and is forward of the first position. Thus, the sheet tray 8 can be withdrawn from the main casing 2 through the opening 20.

The sheet tray 8 includes a tray main body 31; and a pull-out portion 32 as an example of a second receiving portion.

As shown in FIGS. 1A through 3, the tray main body 31 is configured from a rear plate 34, a bottom plate 35, a pair of rear side plates 36, a rear support column 37 as an example of a second fulcrum, and a rear upper plate 38 as an example of a third receiving portion and an example of a plate part of a third receiving portion.

The rear plate 34 has a shape of a flat plate extending in the left-right direction, and is substantially in a vertically-elongated rectangular shape in side view.

The bottom plate 35 has a shape of a flat plate extending in the left-right direction, and is substantially in a horizontally-elongated rectangular shape in side view. A rear end of the bottom plate 35 is continuous with a lower end of the rear plate 34.

Each of the pair of rear side plates 36 has a shape of a flat plate extending in the front-rear direction, and is substantially in a vertically-elongated rectangular shape in front view. One rear side plate 36 disposed on the left side is continuous with left ends of the rear plate 34 and of the bottom plate 35. The other rear side plate 36 disposed on the right side is continuous with right ends of the rear plate 34 and of the bottom plate 35.

The sheet accommodation chamber 10 is partitioned by the rear plate 34, the bottom plate 35, and the pair of rear side plates 36 of the tray main body 31 and a front plate 47 and a pair of front side plates 48 of the pull-out portion 32, wherein the front plate 47 and front side plates 48 will be described later.

The rear support column 37 is located in a rear portion of the tray main body 31 at a position above the sheet accommodation chamber 10. The rear support column 37 is generally of a cylindrical shape extending in the left-right direction. The left-side end of the rear support column 37 is fixed to the rear side plate 36 on the left side, while the right-side end of the rear support column 37 is fixed to the rear side plate 36 on the right side.

The rear upper plate 38 has a flat plate shape, and is substantially in an elongated rectangular shape in side view. The rear upper plate 38 is disposed at a position above the sheet accommodation chamber 10 and forward of the rear support column 37. The rear upper plate 38 extends forwardly from a position forward of the rear support column 37, to a position near to the front plate 47. It can therefore be said that the rear upper plate 38 extends in a radial direction of the rear support column 37. The rear upper plate 38 is pivotably connected to the rear support column 37 such that the rear upper plate 38 can pivot about an axis of the rear support column 37. The rear upper plate 38 is provided with a third driven roller 39 and a fourth driven roller 40 as an example of a conveying roller.

The third driven roller 39 is generally of a cylindrical shape extending in the left-right direction, and is rotatably supported to the rear upper plate 38 in a front portion of the rear upper plate 38.

The fourth driven roller 40 is generally of a cylindrical shape extending in the left-right direction, and is rotatably supported to the rear upper plate 38 in a rear portion of the rear upper plate 38.

The first conveying roller 41 is rotatably supported in a lower front portion of the main casing 2. The first conveying roller 41 is generally of a cylindrical shape extending in the left-right direction. The second conveying roller 42 is rotatably supported in a lower rear portion of the main casing 2. The second conveying roller 42 is generally of a cylindrical shape extending in the left-right direction. When the sheet tray 8 is mounted in the main casing 2, the first conveying roller 41 is positioned above the third driven roller 39 and is in contact with an upper end of the third driven roller 39, and the second conveying roller 42 is positioned above the fourth driven roller 40 and is in contact with an upper end of the fourth driven roller 40.

In the sheet tray 8, the pull-out portion 32 is configured to move relative to the tray main body 31 in the front-rear direction between a pulled-out position, in which the pull-out portion 32 is pulled forwardly from the tray main body 31, and an inside position which is rearward of the pulled-out position. In the state where the sheet tray 8 is mounted in the main casing 2, the pull-out portion 32 is accommodated inside the main casing 2 when the pull-out portion 32 is at the inside position, and is pulled out forwardly from the main casing 2 when the pull-out portion 32 is at the pulled-out position. The pull-out portion 32 is configured from: the front plate 47, the pair of front side plates 48, a grip portion 43, a front support column 49 as an example of a first fulcrum, and a front upper plate 50 as an example of a plate part of a second receiving portion. The front plate 47, front side plates 48, grip portion 43, front support column 49, and front upper plate 50 move as one integral unit, that is, the pull-out portion 32.

The grip portion 43 has a shape of a flat plate extending in the left-right direction, and is substantially in a vertically-elongated rectangular shape in side view.

The front plate 47 has a shape of a flat plate extending in the left-right direction, and is substantially in a vertically-elongated rectangular shape in side view. The front plate 47 is fixed to the rear surface of the grip portion 43.

Each of the pair of front side plates 48 has a shape of a flat plate extending in the front-rear direction, and is substantially in a vertically-elongated rectangular shape in front view. One front side plate 48 on the left side is continuous with a left end of the front plate 47, and the other front side plate 48 on the right side is continuous with a right end of the front plate 47.

The grip portion 43 is formed with a concave portion 43*a* in a lower front portion of the grip portion 43. The concave portion 43*a* is recessed rearward from the front surface of the grip portion 43.

The grip portion 43 is provided with a switch 44. The switch 44 is disposed in the left internal portion of the concave portion 43*a*. The switch 44 is configured to move between a first state 44*a* in which a front surface of the switch 44 is substantially flush with the front surface of the grip portion 43, and a second state 44*b* in which the switch 44 has retracted rearward from the first state 44*a*. The switch 44 is usually maintained in the first state 44*a* due to an urging force of a spring (not shown) provided in the pull-out portion 32. That is, unless the switch 44 is pressed rearwardly against the urging force of the spring (not shown), the switch 44 is kept in the first state 44*a*. When the switch 44 is in the first state 44*a*, the switch 44 keeps the pull-out portion 32 at the inside position, by restricting the pull-out portion 32 from moving relative to the tray main body 31. For example, the switch 44 in the first state 44*a* is engaged with the tray main body 31, thereby fixing the pull-out portion 32 relative to the tray main body 31. When the switch 44 is pressed by a user rearwardly against the urging force of the spring (not shown) and is moved from the first state 44*a* to the second state 44*b*, the switch 44 cancels the restriction on the movement of the pull-out portion 32. For example, when the switch 44 shifts from the first state 44*a* to the second state 44*b*, the switch 44 disengages from the tray main body 31. As a result, the pull-out portion 32 becomes capable of being pulled forwardly relative to the tray main body 31. The switch 44 is maintained in the second state 44*b* until the pull-out portion 32 returns from the pulled-out position back to the inside position. For example, the grip portion 43 is provided with a locking mechanism (not shown) for locking the switch 44 to the second state 44*b* against the urging force of the spring (not shown) while the pull-out portion 32 is located at the pulled-out position.

The front support column 49 is located in an upper portion of the grip portion 43, and is generally of a cylindrical shape extending in the left-right direction. The front support column 49 is fixed to the grip portion 43.

The front upper plate 50 has a flat plate shape, and is substantially in an elongated rectangular shape in side view. The front upper plate 50 is disposed at a position on the front portion of the rear upper plate 38 and rearward of the front support column 49. The front upper plate 50 extends rearwardly from a position rearward of the front support column 49, to a position near to the third driven roller 39 and first conveying roller 41. It can therefore be said that the front upper plate 50 extends in a radial direction of the front support column 49. The front upper plate 50 is pivotably connected to the front support column 49 such that the front upper plate 50 can pivot about an axis of the front support column 49. The front upper plate 50 is for receiving, on an upper surface thereof, a second sheet P2 different from the first sheet P1.

Figure 2B:
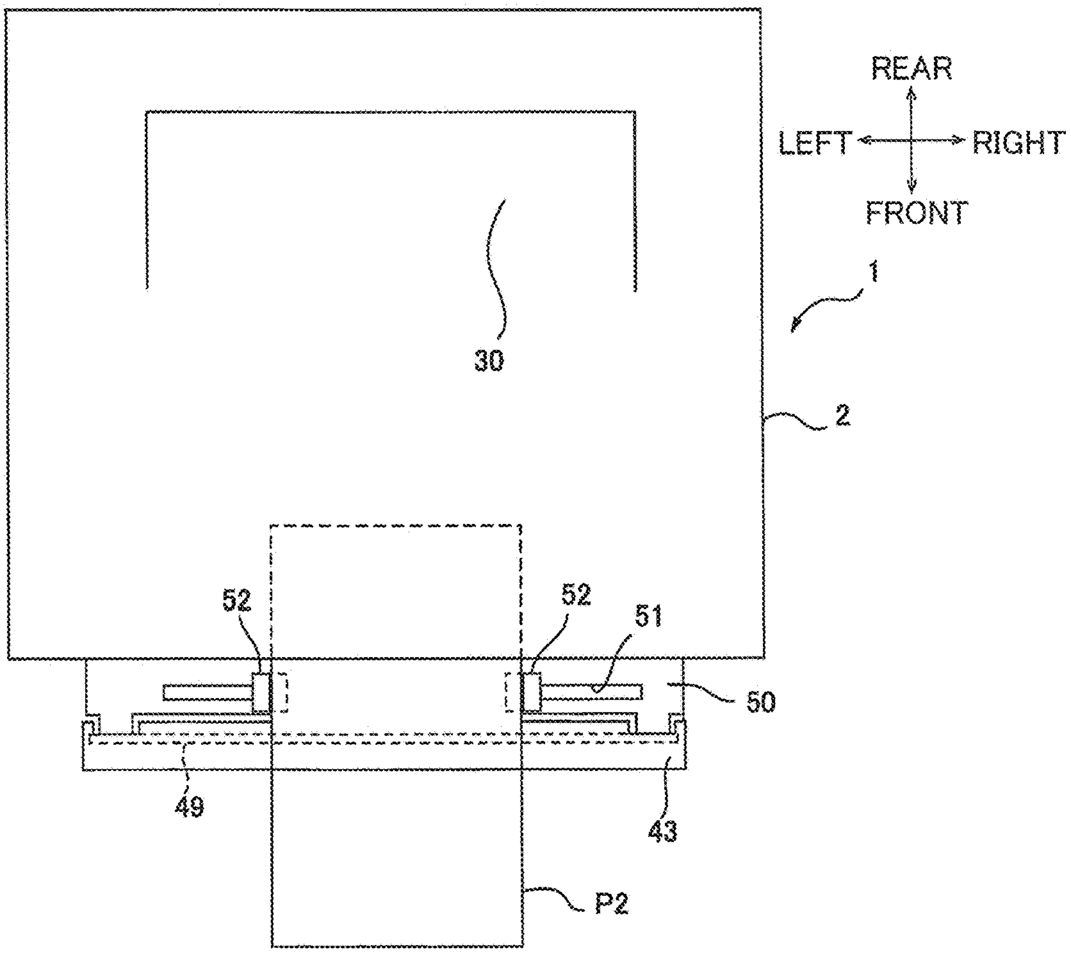
FIG. 2B is a plan view of the printer shown in FIG. 2A.

As shown in FIG. 2B, a slide groove 51 is formed on an upper surface of the front upper plate 50 at a position in a front portion of the front upper plate 50. The slide groove 51 is recessed downward from the upper surface of the front upper plate 50. The slide groove 51 is elongated in the left-right direction.

A pair of regulation bodies 52 is slidably attached to the upper surface of the front upper plate 50. Each regulation body 52 is substantially in an L-shape in front view. Each regulation body 52 is oriented such that a base part of the L-shape extends in the left-right direction, and a protruding part of the L shape extends upwardly from an outward end of the base part in the left-right direction. The base part of the L-shaped regulation body 52 is slidably fitted into the slide groove 51 such that the regulation body 52 can move in the left-right direction along the slide groove 51. The regulation bodies 52 are interlocked with each other such that when one regulation body 52 is moved outward in the left-right direction, the other regulation body 52 moves also outward in the left-right direction and when one regulation body 52 is moved inward in the left-right direction, the other regulation body 52 moves also inward in the left-right direction.

3. Movement of Sheet Tray Between First and Second Positions and Movement of Front Upper Plate and Rear Upper Plate Next will be described how the sheet tray 8 is moved between the first position and the second position. It is noted that a user operates each component in the sheet tray 8 when moving the sheet tray 8 between the first position and the second position.

Figure 1B:
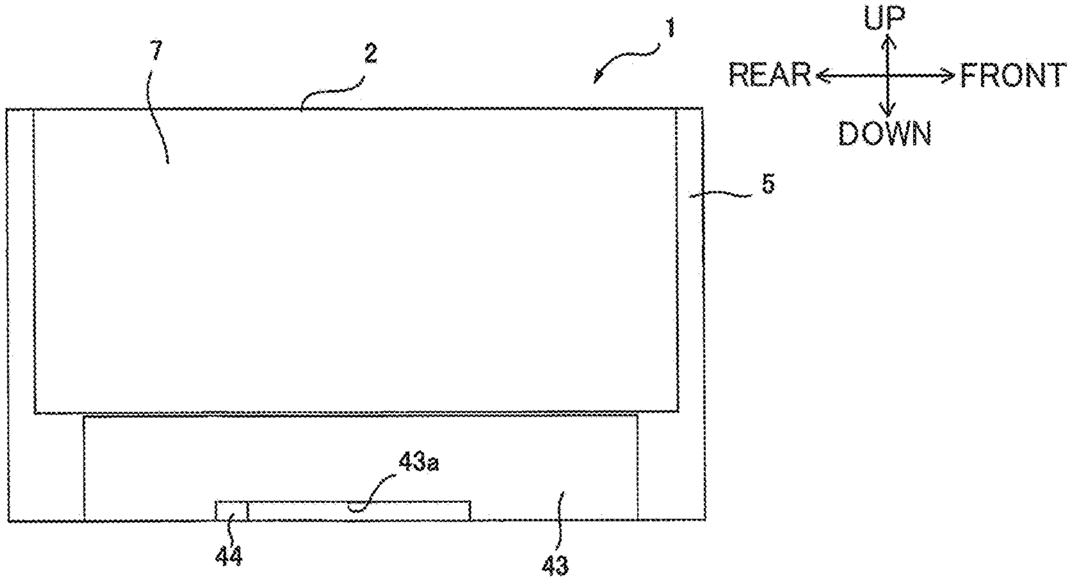
FIG. 1B is a front view of the printer shown in FIG. 1A.

First, in the situation shown in FIGS. 1A and 1B, the sheet tray 8 is at the first position and a first sheet P1 can be conveyed from the sheet tray 8.

The sheet tray 8 is moved slidingly forward to the second position shown in FIG. 3.

In this state, the rear upper plate 38 is pivoted rearward (counterclockwise in the figure) around the rear support column 37, and the front upper plate 50 is pivoted forward (clockwise in the figure) around the front support column 49. As a result, the sheet accommodation chamber 10 is fully exposed, and a stack of the first sheets P1 can be easily placed in the sheet accommodation chamber 10.

In order to move the sheet tray 8 from the second position back to the first position, both of the rear upper plate 38 and the front upper plate 50 are pivoted to their original states in which the rear upper plate 38 and the front upper plate 50 are placed on a plane extending in the front-rear direction above the sheet accommodation chamber 10.

In this state, the sheet tray 8 is slid rearward until the entire part of the sheet tray 8 is inside the main casing 2 as shown in FIGS. 1A and 1B.

4. Movement of Pull-Out Portion 32 Between Inside Position and Pulled-Out Position Next will be described how the pull-out portion 32 is moved between the inside position and the pulled-out position. It is noted that a user operates each component in the pull-out portion 32 when moving the pull-out portion 32 between the inside position and the pulled-out position.

In the situation shown in FIGS. 1A and 1B, the pull-out portion 32 is at the inside position. At this time, the front plate 47 of the pull-out portion 32 is in contact with the bottom plate 35. The front upper plate 50 is at a fourth position that is inside the main casing 2 and is above the sheet accommodation chamber 10. If the front upper plate 50 is projected vertically, the front upper plate 50 is entirely rearward of the front wall 5. In other words, the front upper plate 50 is entirely rearward of the opening 20. At this time, the grip portion 43 closes the opening 20.

When the switch 44 is pressed to shift from the first state 44*a* to the second state 44*b*, the restriction by the switch 44 on the movement of the pull-out portion 32 is cancelled, and the pull-out portion 32 becomes capable of moving forwardly relative to the tray main body 31. Then, as shown in FIGS. 2A and 2B, while the tray main body 31 is maintained in the main casing 2, the pull-out portion 32 is pulled forwardly to the pulled-out position. When the pull-out position 32 is thus positioned at the pulled-out position, a gap is formed between the front plate 47 and the bottom plate 35 in the front-rear direction. At this time, the opening 20 is partly opened, and the front upper plate 50 is positioned at a third position that is outside the main casing 2 and is forward of the fourth position. When the pull-out portion 32 is thus positioned at the pulled-out position, if the front upper plate 50 is projected vertically, at least the front part of the front upper plate 50 is forward of the front wall 5. In other words, at least the front part of the front upper plate 50 is forward of the opening 20. A second sheet P2 is then inserted into the main casing 2 through the opening 20 until a rear edge of the second sheet 2 comes in contact with the first conveying roller 41 and third driven roller 39. In this manner, the second sheet P2 is placed on the upper surfaces of the front upper plate 50 and the rear upper plate 38, and is ready to be conveyed by the first conveying roller 41 and the third driven roller 39. The regulation bodies 52 restrict the second sheet P2 from moving in the left-right direction.

In order to move the pull-out portion 32 from the pulled-out position back to the inside position, the pull-out portion 32 is moved from the pulled-out position rearwardly until the front plate 47 comes in contact with the bottom plate 35. As a result, the pull-out portion 32 reaches the inside position. The opening 20 is closed by the grip portion 43. It is noted that when the pull-out portion 32 reaches the inside position, the switch 44 shifts from the second state 44*b* back to the first state 44*a*, and restricts the pull-out portion 32 from moving forwardly from the inside position.

As described above, in the state where the sheet tray 8 is at the first position inside the main casing 2, when the pull-out portion 32 is at the inside position and the front upper plate 50 is at the fourth position as shown in FIGS. 1A and 1B, the opening 20 is entirely closed by the pull-out portion 32 and no part of the front upper plate 50 is exposed outside the main casing 2. When the pull-out portion 32 is at the pulled-out position and the front upper plate 50 is at the third position as shown in FIGS. 2A and 2B, the opening 20 is partly exposed outside the main casing 2 and the front upper plate 50 is partly exposed outside the main casing 2.

It is noted that also when the sheet tray 8 is at the second position, the pull-out portion 32 can be pulled forwardly from the inside position to the pulled-out position as shown in FIG. 3 by pressing the switch 44 from the first state 44*a* to the second state 44*b*. When the pull-out portion 32 is thus in the pulled-out position, the sheet accommodation chamber 10 is expanded in size in the front-rear direction, which makes it easier for a user to place the first sheets P1 in the sheet accommodation chamber 10. The sheet tray 8 can accept longer sheets that are longer in the conveyance direction than those sheets that can be accepted in the sheet tray 8 when the pull-out portion 32 is in the inside position.

5. Printing Operation in Printer

The printing operation is carried out under control by the controller 70.

First, printing operation on the first sheet P1 will be described. As shown in FIGS. 1A and 1B, the controller 70 controls the sheet supply roller 9 for feeding the first sheet P1 accommodated in the sheet accommodation chamber 10 of the sheet tray 8 so as to convey the sheet P1 such that a rear edge (FIG. 1A) of the sheet P1 moves upwardly as the leading end in the sheet conveying direction and a front edge (FIG. 1A) of the sheet P1 moves rearwardly as the trailing end in the sheet conveying direction. The controller 70 also controls a feed roller (not shown) so as to direct the first sheet P1 to a location between the secondary transfer roller 26 and the intermediate transfer belt 25.

In each process cartridge 17, toner is supplied to the developing roller (not shown) and is carried on the developing roller in the form of a thin toner layer in accordance with the rotation of the developing roller while being charged with positive polarity upon triboelectric charging.

On the other hand, in accordance with the rotation of the photosensitive drum 18, the surface of the photosensitive drum 18 is uniformly charged with positive polarity by the charger (not shown), before being exposed to a high speed scanning of a laser beam emitted from the scanner unit 11. Thus, an electrostatic latent image is formed on the surface based on image data indicative of an image to be formed on the first sheet P1.

The toner carried on the surface of the developing roller and charged with positive polarity is supplied to the electrostatic latent image formed on the surface of the photosensitive drum 18 in accordance with further rotation of the photosensitive drum 18. Thus, a toner image is formed on the surface of the photosensitive drum 18 through a reverse development process.

Toner images thus carried on the photosensitive drums 18 of the process cartridges 17 are successively transferred onto the upper portion of the intermediate transfer belt 25 that is moved frontward. As a result, a multicolor toner image is formed on the surface of the intermediate transfer belt 25 (primary image transfer).

Then the controller 70 controls the secondary transfer roller 26 so as to transfer the multicolor toner image on the intermediate transfer belt 25 onto the first sheet P1 (secondary image transfer) when the first sheet P1 supplied from the sheet tray 8 moves between the intermediate transfer belt 25 and the secondary transfer roller 26.

Then the controller 70 controls the heat roller 27 and the pressure roller 28 so as to thermally fix the multicolor toner image onto the first sheet P1 when the first sheet P1 moves between the heat roller 27 and the pressure roller 28.

Then the controller 70 controls the discharge rollers 29 so as to direct the first sheet P1 diagonally frontward and upward along a U-turn path and discharge the first sheet P1 onto the discharge tray 30.

Printing operation on the second sheet P2 will next be described.

As shown in FIGS. 2A and 2B, the controller 70 performs a control operation to convey, to the transfer unit 13, the second sheet P2 that has been supplied through the opening 20 into the main casing 2 by the front upper plate 50.

More specifically, the controller 70 controls the first conveying roller 41 and second conveying roller 42 to convey the second sheet P2 to a position between the intermediate transfer belt 25 and the secondary transfer roller 26 such that a rear edge of the second sheet P2 is the leading end in the conveying direction.

Then, as in the case of forming an image on the first sheet P1, the controller 70 performs a control such that a multicolor toner image is transferred from the intermediate transfer belt 25 onto the second sheet P2 when the second sheet P2 passes between the intermediate transfer belt 25 and the secondary transfer roller 26 (secondary transfer). The controller 70 performs a control such that the multicolor toner image that has been transferred onto the second sheet P2 is thermally fixed by the fixing unit 14 and the second sheet P2 is discharged onto the sheet discharge tray 30 after passing between the sheet discharge rollers 29.

6. Operation and Effects (1) In the printer 1, as shown in FIGS. 1A through 2B, the front upper plate 50 moves between the third position and fourth position while the sheet tray 8 is maintained at the first position. Therefore, without moving the tray main body 31 of the sheet tray 8 outside the main casing 2, the front upper plate 50 can be moved to the third position and can smoothly receive the second sheet P2 thereon.

Moreover, the front upper plate 50 is provided on the sheet tray 8. The front upper plate 50 can receive the second sheet P2 thereon in a more stable manner, in comparison with a comparative configuration in which the front upper plate 50 is provided on the front cover 7.

(2) As shown in FIG. 2A, when the front upper plate 50 is disposed in the third position, the front upper plate 50 is disposed at a vertical level higher than the sheet accommodation chamber 10. Therefore, a user can easily recognize the front upper plate 50. The user can easily place the second sheet P2 on the front upper plate 50, which leads to improvement in convenience.

(3) As shown in FIGS. 1A through 3, a user can work in front of the printer 1 when moving the sheet tray 8 between the first and second positions, when moving the front upper plate 50 between the third and fourth positions, and when mounting the process unit 12 into the main casing 2. Thus, the user can always work in front of the printer 1, which leads to further improvement in convenience.

(4) As shown in FIGS. 1A through 2B, by sliding the pull-out portion 32 in the front-rear direction, the front upper plate 50 can be moved smoothly between the third and fourth positions.

(5) As shown in FIGS. 2A and 2B, when the front upper plate 50 is at the third position, the front upper plate 50 becomes positioned close to a user who is working on the printer 1, which leads to further improvement in convenience.

(6) As shown in FIG. 2A, the first conveying roller 41, second conveying roller 42, third driven roller 39, and fourth driven roller 40 can reliably convey the second sheet P2 from the front upper plate 50 to the transfer unit 13.

(7) As shown in FIG. 2A, the rear upper plate 38 can reliably support the second sheet P2 thereon while the second sheet P2 is conveyed from the front upper plate 50 to the transfer unit 13.

(8) As shown in FIG. 3, the rear portion of the front upper plate 50 and the front portion of the rear upper plate 38 can be moved away from the sheet accommodation chamber 10 by pivoting the front upper plate 50 around the front support column 49 and pivoting the rear upper plate 38 around the rear support column 37. As a result, the user can easily place the first sheets P1 in the sheet accommodation chamber 10.

(9) By operating the switch 44, the front upper plate 50 can be moved between the third and fourth positions as shown in FIGS. 1A through 2B.

7. Second Embodiment

Hereinafter, a printer 101 according to a second embodiment will be described with reference to FIGS. 4A through 7. In the following description, the same or like components as those in the first embodiment are represented by the same reference numerals, and description thereof will be omitted.

The printer 101 of the second embodiment is the same as the printer 1 of the first embodiment except that the printer 101 employs a sheet tray 108 in place of the sheet tray 8.

The sheet tray 8 according to the first embodiment includes the pull-out portion 32. Contrarily, the sheet tray 108 according to the second embodiment has no pull-out portion 32. Instead, the sheet tray 108 is provided with: a front plate 147; a grip portion 143; and a pivoting portion 60 as an example of a second receiving portion. The front plate 147 has the same shape with the front plate 147 in the first embodiment, but is fixed to both of the bottom plate 35 and the pair of rear side plates 36. The grip portion 143 has the same configuration with the grip portion 43 in the first embodiment except for the following points: That is, the grip portion 143 is fixed not only to the front plate 47 but also to the pair of rear side plates 36. Specifically, the grip portion 143 is continuous with the rear side plates 36. The grip portion 143 holds the pivoting portion 60 at its upper front edge so that the pivoting portion 60 is pivotable relative to the grip portion 143. More specifically, as shown in FIGS. 4A through 5B, the grip portion 143 has: a widthwise central part 143*a*; and a pair of widthwise outer parts 143*b* which are disposed at a pair of outer sides of the widthwise central part 143*a* in the left-right direction. Rear ends of the pair of widthwise outer parts 143*b* are continuous with front ends of the pair of rear side plates 36. The widthwise central part 143*a* defines a recess on its front surface. That is, the front surface of the widthwise central part 143*a* is disposed at a position rearward from the front surface of the widthwise outer parts 143*b*. The pivoting portion 60 is disposed in the recess on the front surface of the widthwise central part 143*a* and is pivotably supported by the widthwise outer parts 143*b*. It is noted that the widthwise central part 143*a* defines a recess also on its upper surface. That is, the upper surface of the widthwise central part 143*a* is disposed at a vertical level lower than the upper surface of the widthwise outer parts 143*b*. The recess on the upper surface of the widthwise central part 143*a* is in communication with the recess on the front surface of the widthwise central part 143*a*.

The pivoting portion 60 is configured from: a pivoting plate 60*a* as an example of a plate part of a second receiving portion; and a pair of rotation support columns 60*b* as an example of a first fulcrum.

Figure 4A:
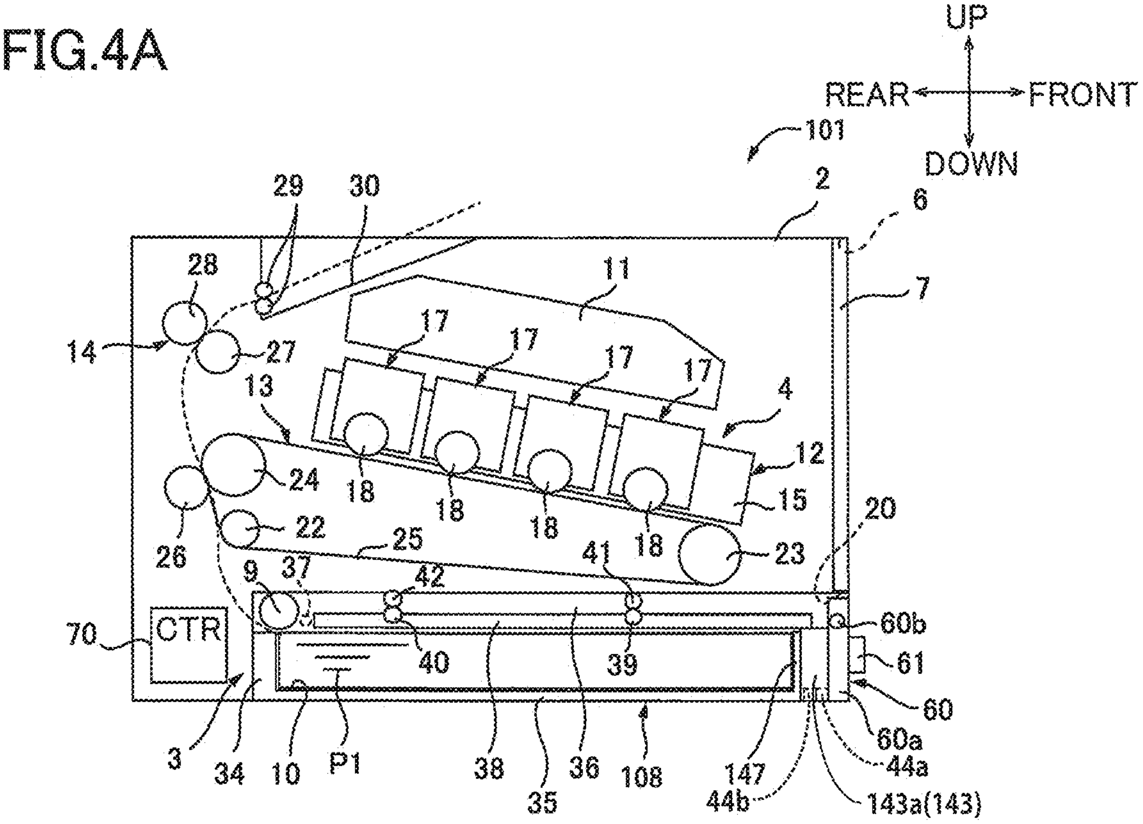
FIG. 4A is a cross-sectional view of a printer as an example of an image forming apparatus according to a second embodiment of the present invention, the cross-sectional view being taken along a widthwise center line of the printer and showing that a pivoting portion is oriented vertically.
Figure 4B:
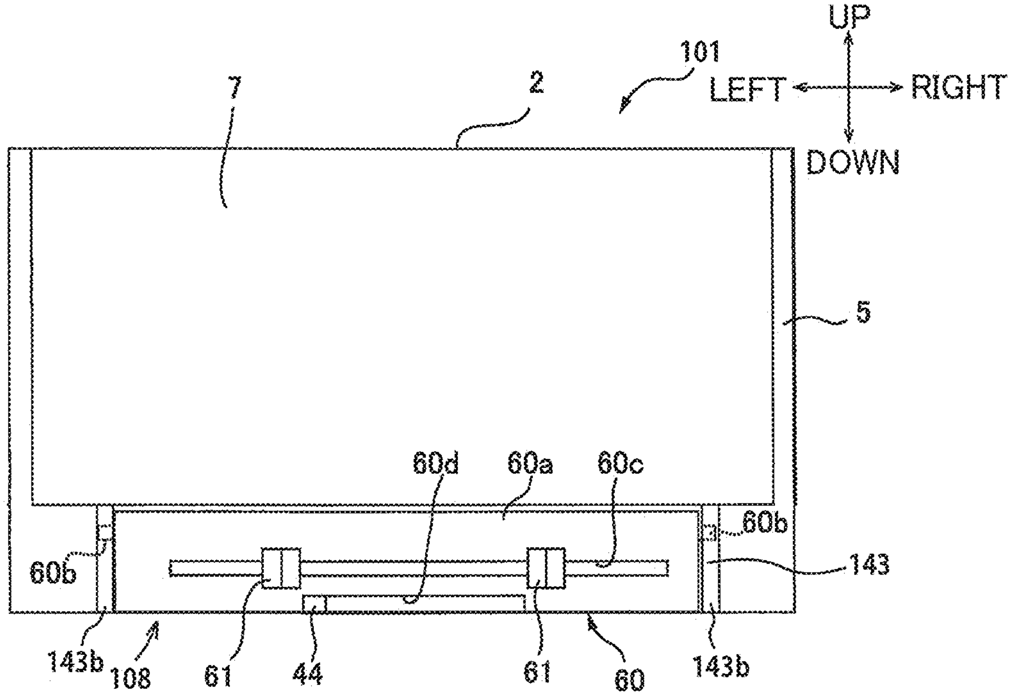
FIG. 4B is a front view of the printer shown in FIG. 4A.
Figure 5A:
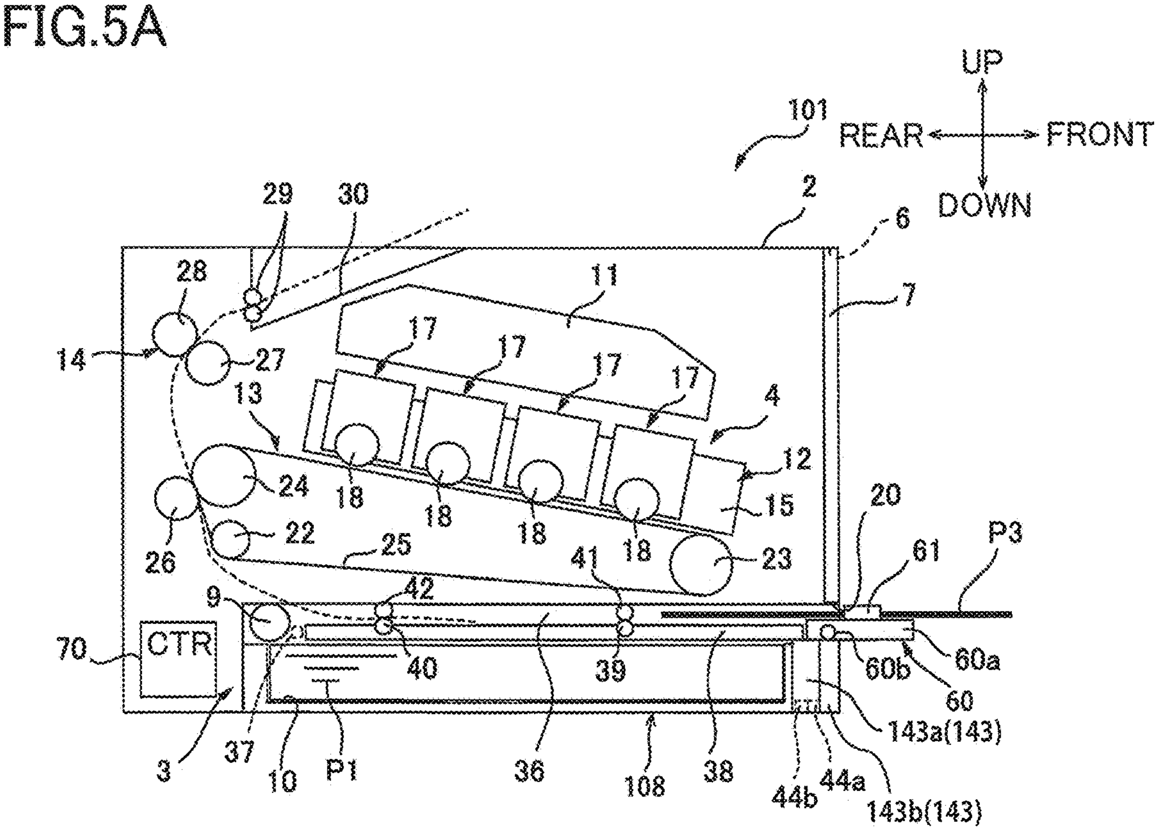
FIG. 5A is a cross-sectional view of the printer according to the second embodiment, the cross-sectional view being taken along a widthwise center line of the printer and showing that the pivoting portion is oriented horizontally.
Figure 5B:
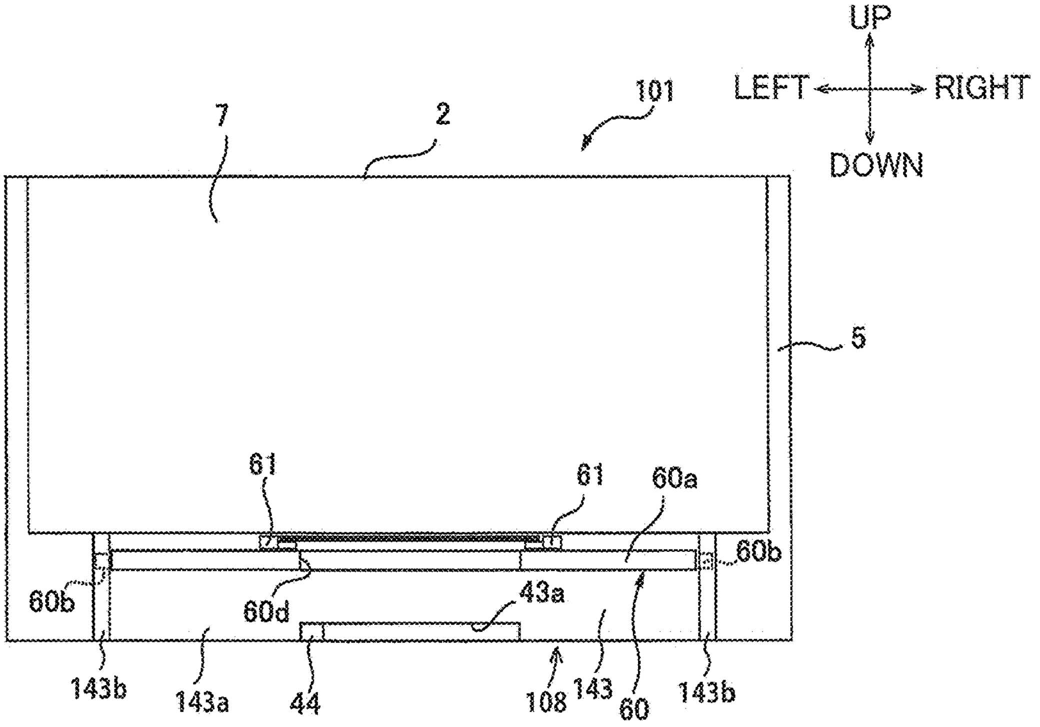
FIG. 5B is a front view of the printer shown in FIG. 5A.

The pivoting plate 60*a* has a plate shape that extends in the left-right direction, and is substantially in an elongated rectangular shape in side view. The rotation support columns 60*b* protrude outwardly in the left-right direction from upper portions on the outer edge surfaces of the pivoting plate 60*a* in the left-right direction. It can therefore be said that the pivoting plate 60*a* extends in a radial direction of the rotation support columns 60*b*. The rotation support columns 60*b* are rotatably held by the widthwise outer parts 143*b* of the grip portion 143. The pivoting portion 60 can therefore pivot about an axis of the rotation support columns 60*b* in such a way that the lower end of the pivoting portion 60 moves toward the front and to the rear. The pivoting plate 60*a* is movable between the fourth position, at which the pivoting plate 60*a* is oriented vertically as shown in FIGS. 4A and 4B to extend along the front surface of widthwise central part 143*a* of the grip portion 143, and the third position at which the pivoting plate 60*a* is oriented horizontally to extend in the front-rear direction as shown in FIGS. 5A and 5B and protrudes forwardly from the grip portion 143. Thus, when the pivoting plate 60*a* is in the third position, the pivoting plate 60*a* protrudes forwardly from the main casing 2. In this way, the pivoting portion 60 is configured to pivot around the axis of the rotation support columns 60*b*.

The pivoting plate 60*a* is formed with an opening 60*d* at its one edge that becomes a lower edge when the pivoting plate 60*a* is in the fourth position shown in FIGS. 4A and 4B. The opening 60*d* is a rectangular-shaped cutout that is formed by cutting the pivoting plate 60*a* upwardly from the edge of the pivoting plate 60*a*. The opening 60*d* is located in the center portion of the pivoting plate 60*a* in the left-right direction. When the pivoting plate 60*a* is in the fourth position shown in FIGS. 4A and 4B, if the pivoting plate 60*a* is projected in the front-rear direction, the opening 60*d* overlaps with the concave portion 43*a* of the grip portion 143. It is noted that according to the present embodiment, the concave portion 43*a* is formed on the widthwise central part 143*a*. Accordingly, a user can access, through the opening 60*d*, the switch 44 provided in the concave portion 43*a*.

Similarly to the first embodiment, when being in the first state 44*a*, the switch 44 restricts the pivoting plate 60*a* from moving from the fourth position shown in FIGS. 4A and 4B and maintains the pivoting plate 60*a* in the fourth position. When the switch 44 is pressed against the urging force of the spring (not shown) to shift from the first state 44*a* to the second state 44*b*, the switch 44 cancels the restriction on the movement of the pivoting plate 60*a* and the pivoting plate 60*a* becomes capable of moving to the third position shown in FIGS. 5A and 5B.

As shown in FIG. 4B, a slide groove 60*c* is formed on a surface of the pivoting plate 60*a* that faces forwardly when the pivoting plate 60*a* is in the fourth position shown in FIGS. 4A and 4B. The slide groove 60*c* is formed at a position substantially in the center portion of the surface of the pivoting plate 60*a*. The slide groove 60*c* is recessed rearward from the surface of the pivoting plate 60*a*. The slide groove 60*c* is elongated in the left-right direction.

A pair of regulation bodies 61 having the same configuration with the regulation bodies 52 in the first embodiment is slidably fitted to the slide groove 60*c* in the same manner as the regulation bodies 52 in the first embodiment. More specifically, the pair of regulation bodies 61 is slidably attached to the surface of the pivoting plate 60*a* that faces forwardly when the pivoting plate 60*a* is in the fourth position shown in FIGS. 4A and 4B. Each regulation body 61 is substantially in an L-shape in a plan view. Each regulation body 61 is oriented such that a base part of the L-shape extends in the left-right direction, and a protruding part of the L shape extends forwardly from an outward end of the base part in the left-right direction. The base part of the L-shaped regulation body 61 is slidably fitted into the slide groove 60*c* such that the regulation body 61 can move in the left-right direction along the slide groove 60*c*. The regulation bodies 61 are interlocked with each other such that when one regulation body 61 is moved outward in the left-right direction, the other regulation body 61 moves also outward in the left-right direction and when one regulation body 61 is moved inward in the left-right direction, the other regulation body 61 moves also inward in the left-right direction.

8. Movement of Pivoting Portion Between Fourth and Third Positions and Operation of Printer Next will be described how the pivoting plate 60*a* moves from the fourth position to the third position.

It is noted that a user operates each component in the sheet tray 108 when moving the pivoting portion 60 (pivoting plate 60*a*) between the fourth and third positions.

In the situation shown in FIGS. 4A and 4B, the pivoting portion 60 (pivoting plate 60*a*) is at the fourth position. In this state, the pivoting plate 60*a* extends along the front surface of the grip portion 143. At this time, the upper portion of the pivoting plate 60*a* closes the opening 20.

Figure 6:
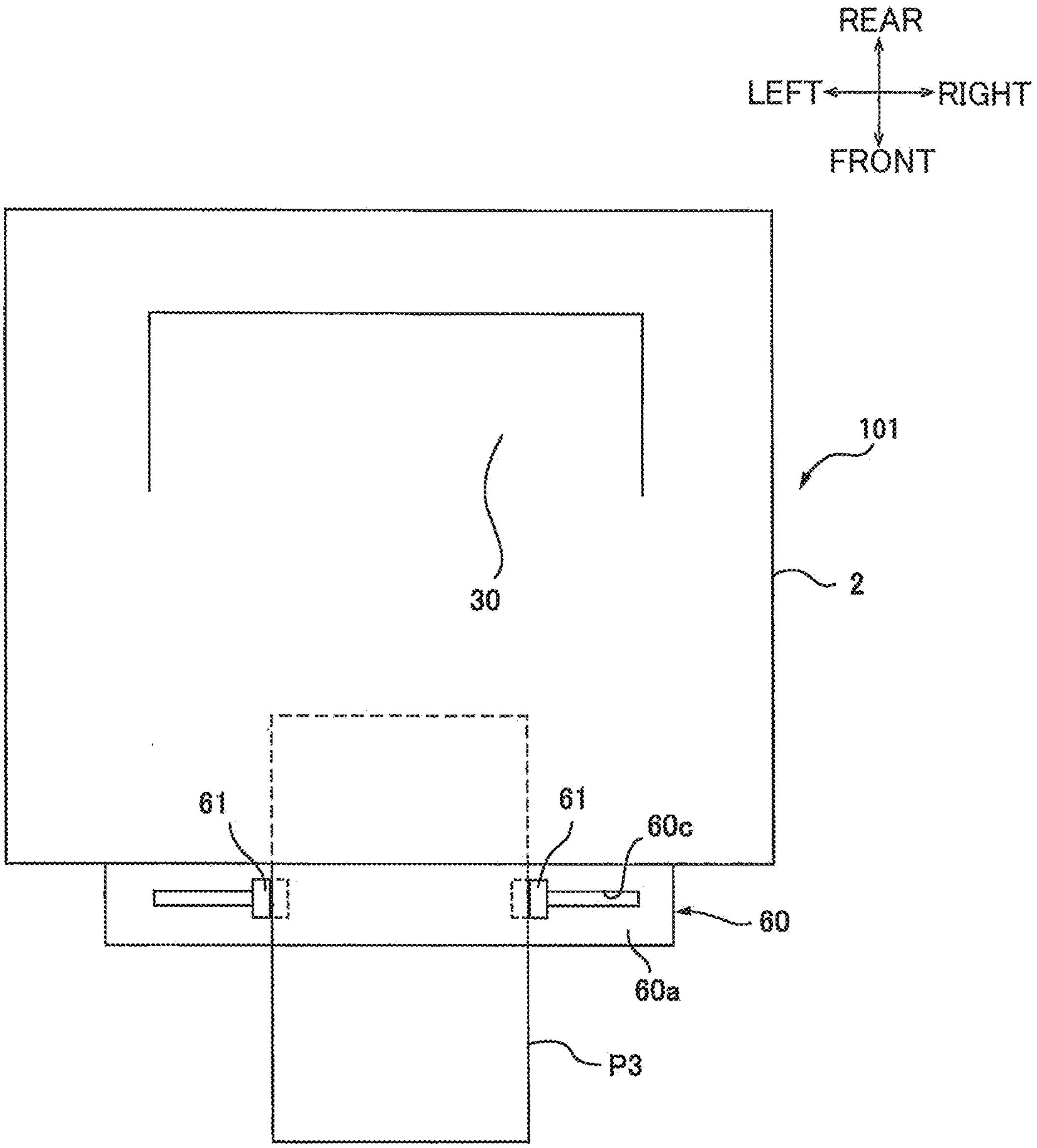
FIG. 6 is a plan view of the printer shown in FIGS. 5A and 5B.

Then, the switch 44 is operated to shift from the first state 44*a* to the second state 44*b*. As a result, the limitation by the switch 44 to the movement of the pivoting plate 60*a* is cancelled, and the pivoting plate 60*a* becomes pivotable relative to the grip portion 143 of the sheet tray 108. When the pivoting plate 60*a* is pivoted forwardly (counterclockwise in FIGS. 4A and 5A) until the pivoting plate 60*a* is oriented along a plane that extends in the front-rear direction as shown in FIGS. 5A, 5B, and 6, the pivoting portion 60 reaches the third position that is at a higher vertical level than the fourth position, and partly opens the opening 20.

In order to move the pivoting portion 60 (pivoting plate 60*a*) from the third position back to the fourth position, the pivoting plate 60*a* is moved from the third position rearwardly (clockwise in FIGS. 4A and 5A) until the pivoting plate 60*a* becomes oriented vertically along the front surface of the grip portion 143. When the pivoting plate 60*a* returns to the fourth position, the pivoting plate 60*a* closes the opening 20, and the switch 44 shifts from the second state 44*b* back to the first state 44*a*, as a result of which the pivoting plate 60*a* is confined in the main casing 2.

Next will be described how the printer 101 operates when the pivoting portion 60 (pivoting plate 60*a*) is at the third position.

When the pivoting portion 60 is at the third position, the controller 70 controls the first conveying roller 41 and the second conveying roller 42 to convey a third sheet P3 that is placed on the pivoting plate 60*a* into the main casing 2 through the opening 20. The controller 70 performs a control operation to convey the third sheet P3 to the transfer unit 13 and discharge the third sheet P3 onto the discharge sheet tray 30 in the same manner as described above in the first embodiment for conveying the second sheet P2.

9. Movement of Sheet Tray Between First and Second Positions and Movement of Rear Upper Plate 38

Next will be described how to move the sheet tray 108 between the first position and the second position according to the second embodiment.

It is noted that a user operates each component in the sheet tray 108 when moving the sheet tray 108 between the first position and the second position.

In the situation shown in FIGS. 4A and 4B, the sheet tray 108 is at the first position that is inside the main casing 2 and a first sheet P1 can be conveyed from the sheet tray 108.

Figure 7:
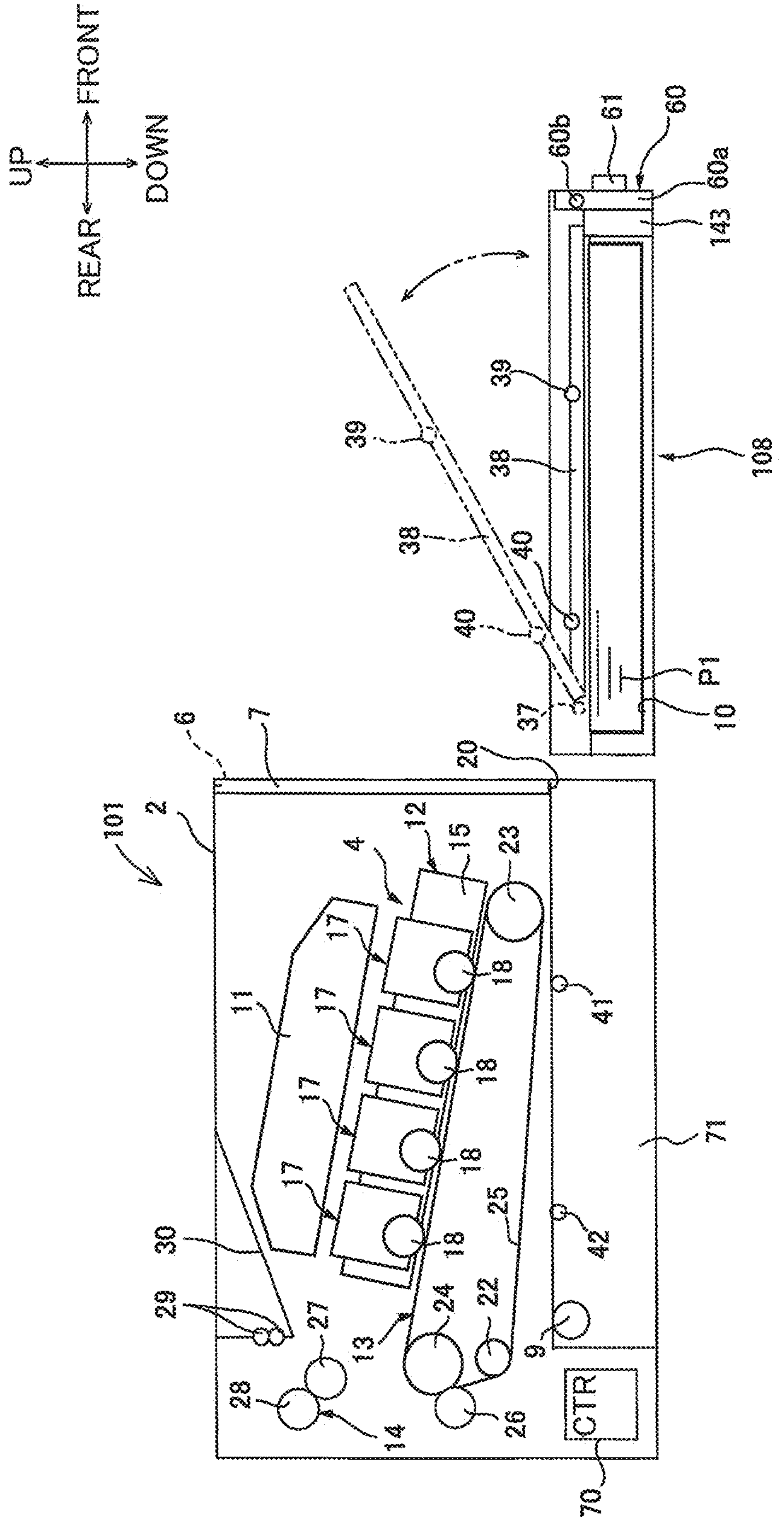
FIG. 7 is a cross-sectional view of the printer according to the second embodiment, and showing a withdrawn state of a sheet tray, the cross-sectional view being taken along a widthwise center line of the printer.

After this state, the sheet tray 108 is slid forward. As a result, as shown in FIG. 7, the sheet tray 108 is placed at the second position that is outside the main casing 2 and that is forward of the first position.

In the state where the sheet tray 108 is placed at the second position, the rear upper plate 38 is pivoted backward (counterclockwise in FIG. 7) around the rear support column 37. As a result, the sheet accommodation chamber 10 is ready to accept a stack of the first sheets P1. After the first sheets P1 are placed in the sheet accommodation chamber 10, the rear upper plate 38 is pivoted forward (clockwise in the figure) around the rear support column 37 until the rear upper plate 38 is placed along a plane that is above the sheet accommodation chamber 10 and that extends in the front-rear direction.

From this state, the sheet tray 108 is slid backward until the entire part of the sheet tray 108 is disposed inside the main casing 2 as shown in FIGS. 4A and 4B.

As described above, in the state where the sheet tray 108 is at the first position inside the main casing 2, when the pivoting portion 60 is at the fourth position as shown in FIGS. 4A and 4B, the opening 20 is entirely closed by the grip portion 143 and the pivoting plate 60*a*. When the pivoting portion 60 is at the third position as shown in FIGS. 5A and 5B, the opening 20 is partly exposed outside the main casing 2.

10. Operation and Effects of Second Embodiment (1) In the printer 101 of the second embodiment, as shown in FIGS. 5A and 5B, the pivoting portion 60 (pivoting plate 60*a*) is pivoted to move between the third and fourth positions. Therefore, the pivoting portion 60 can smoothly move between the third and fourth positions.

(2) More specifically, as shown in FIGS. 5A and 5B, the pivoting plate 60*a* is pivoted around the rotation support columns 60*b*. Therefore, the pivoting portion 60 can smoothly move between the third and fourth positions.

(3) More specifically, as shown in FIGS. 5A and 5B, the pivoting plate 60*a* is pivoted around the rotation support columns 60*b* from a lower side to a front side.

Therefore, the pivoting portion 60 can smoothly move between the third and fourth positions.

11. Third Embodiment

Figure 8:
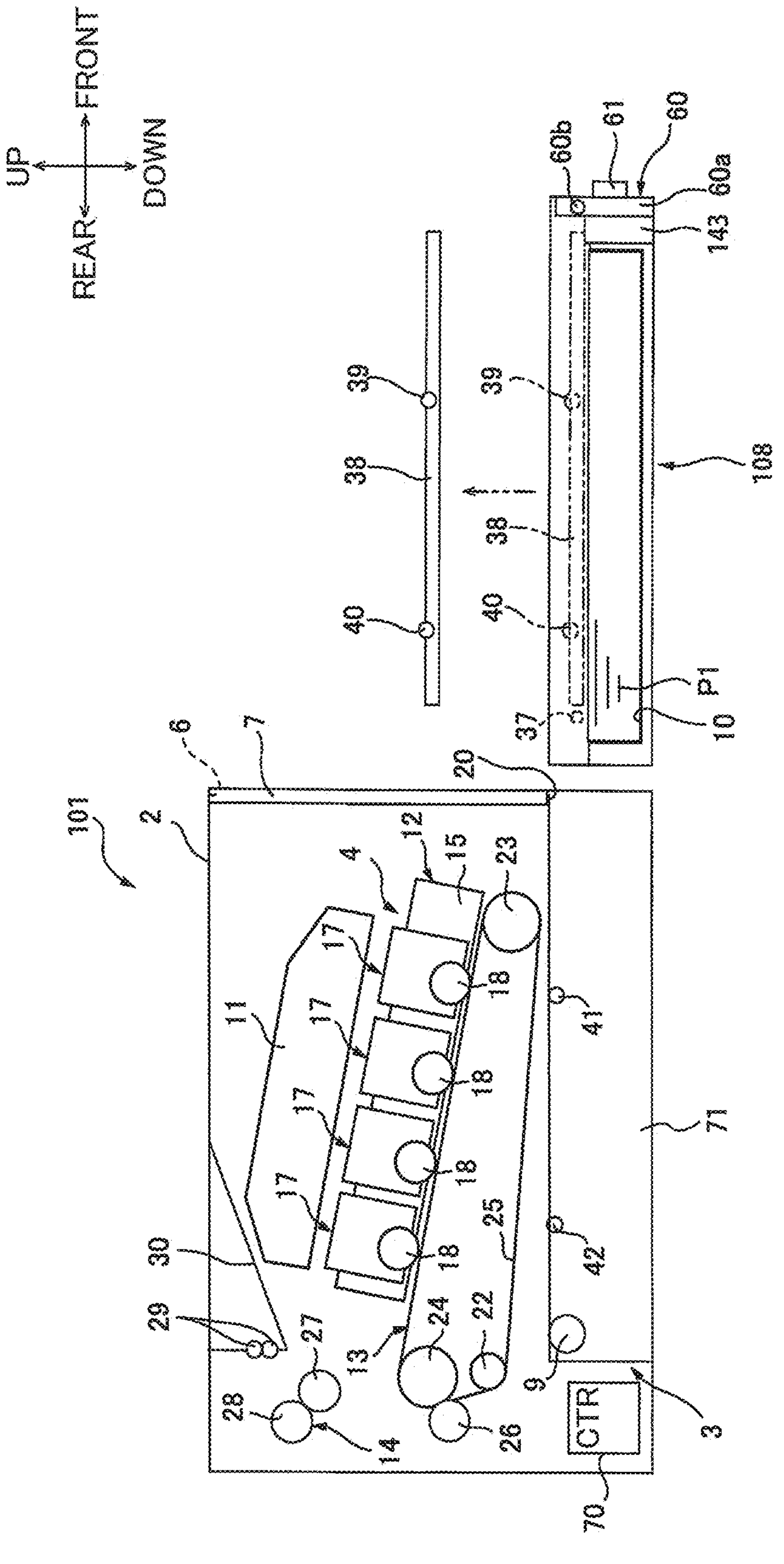
FIG. 8 is a cross-sectional view of a printer as an example of an image forming apparatus according to a third embodiment of the present invention, the cross-sectional view being taken along a widthwise center line of the printer.

In the second embodiment described above, the rear upper plate 38 can pivot about the rear support column 37. However, as shown in FIG. 8, the rear upper plate 38 may not be pivotable about the rear support column 37, but may be attachable to and detachable from the rear support column 37.

By detaching the rear upper plate 38 from the rear support column 37, the sheet accommodation chamber 10 can be widely opened and a stack of first sheets P1 can be easily placed in the sheet accommodation chamber 10.

While the invention has been described in detail with reference to the embodiments thereof, it would be apparent to those skilled in the art that various changes and modifications may be made therein without departing from the spirit of the invention.

The invention claimed is:

1. An image forming apparatus comprising:

a main casing;

a plurality of process cartridges each having a photosensitive drum;

a process frame configured to accommodate therein the plurality of process cartridges;

an intermediate transfer belt configured to receive a developer image transferred from each photosensitive drum;

a secondary transfer roller configured to transfer the developer image from the intermediate transfer belt to a sheet;

a sheet feed tray configured to accommodate a first sheet therein;

a sheet feed roller configured to feed the first sheet accommodated in the sheet feed tray toward the secondary transfer roller in a first sheet conveying direction; and a manual feed part configured to feed a second sheet that is inserted into the main casing, the manual feed part comprising:

a first part disposed above the sheet feed tray and below the intermediate transfer belt, the first part including a roller, the roller being configured to feed the second sheet toward a position, which is defined between the sheet feed roller and the secondary transfer roller in the first sheet conveying direction, without the second sheet being conveyed by the sheet feed roller; and a second part disposed above the sheet feed tray and below the intermediate transfer belt, the second part being disposed upstream of the first part in a second sheet conveying direction of the second sheet fed by the roller, the second part being configured to receive the second sheet, and the second part being movable relative to the first part, wherein the main casing is formed with an opening, wherein the main casing includes a front cover configured to open and close the opening, the process frame being movable through the opening when the front cover is open, the process frame being movable through the opening between an inside position and an outside position, the process frame being inside the main casing when the process frame is at the inside position, and at least part of the process frame is outside the main casing when the process frame is at the outside position, wherein the process frame accommodates the plurality of process cartridges such that the plurality of process cartridges are arranged in a front-rear direction, the plurality of process cartridges including a first process cartridge that is closest to the front cover in the front-rear direction among the plurality of process cartridges when the process frame is at the inside position, and wherein, as viewed in an up-down direction, the first process cartridge is overlapped with a boundary between the first part and the second part in the second sheet conveying direction when the process frame is at the inside position.

2. The image forming apparatus according to claim 1, wherein the second part of the manual feed part is detachably attached to the main casing.

3. The image forming apparatus according to claim 1, wherein the second part of the manual feed part is movable relative to the first part of the manual feed part in the second sheet conveying direction.

4. The image forming apparatus according to claim 1, wherein the second part of the manual feed part is movable between an outside position and an inside position, wherein when the second part of the manual feed part is disposed in the outside position, at least a part of the second part of the manual feed part is outside of the main casing, and when the second part of the manual feed part is disposed in the inside position, the second part of the manual feed part is in the main casing.

5. The image forming apparatus according to claim 1, wherein the second part of the manual feed part includes a pair of regulation bodies, the pair of regulation bodies being configured to regulate the second sheet in a width direction which is perpendicular to the second sheet conveying direction.

6. The image forming apparatus according to claim 5, wherein the second part of the manual feed part includes a plate part configured to receive the second sheet mounted thereon, the pair of regulation bodies being supported by the plate part so as to be movable relative to the plate part in the width direction.

7. The image forming apparatus according to claim 1, wherein the second part of the manual feed part is mountable to the sheet feed tray.

8. The image forming apparatus according to claim 1, wherein the second part of the manual feed part is movable relative to the sheet feed tray.

9. The image forming apparatus according to claim 1, further comprising a first belt roller and a second belt roller, on which the intermediate transfer belt is mounted, wherein the second belt roller is closer to the front cover than the first belt roller is to the front cover in the second sheet conveying direction, and wherein the second part of the manual feed part is closer to the second belt roller than to the first belt roller in the second sheet conveying direction.

10. The image forming apparatus according to claim 1, wherein the second part of the manual feed part is closer to the front cover than the first part of the manual feed part is to the front cover in the second sheet conveying direction.

11. The image forming apparatus according to claim 10, wherein, when the process frame is at the outside position, each of the process cartridges can be attached to and detached from the process frame.

12. The image forming apparatus according to claim 1, wherein the first part of the manual feed part includes a first roller and a second roller, the second roller being disposed upstream of the first roller in the second sheet conveying direction, and wherein the second part of the manual feed part is positioned upstream of the second roller in the second sheet conveying direction.

* * * * *